United States Patent Office 2,918,479
Patented Dec. 22, 1959

2,918,479

HALOGENATED CYCLIC ETHERS

Raymond J. Seffl, Boulder, Colo., assignor to Velsicol Chemical Corporation, Chicago, Ill., a corporation of Illinois No Drawing. Application March 26, 1958
Serial No. 723,968

13 Claims. (Cl. 260—346.1)

This invention relates to new compositions of matter which are useful as chemical intermediates and as insecticides. More specifically, it relates to unique chemical compositions which contain both halogenated cyclopentadiene and halogenated tetrahydrofuran moities, these groups being joined by a common carbon atom.

It is known in the prior art that the reaction of hexahalocyclopentadienes with alcohols in the presence of alkaline condensing agents produces ketals according to the following reaction scheme (where $a$, $b$, $c$, $d$, and Y are chlorine or bromine atoms):

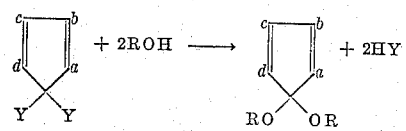

Thus, J. S. Newcomer and E. T. McBee have reported (Journal of the American Chemical Society, volume 71, 1949, pages 946–951) that the reaction of hexachlorocyclopentadiene with methyl or ethyl alcohol in the presence of KOH produces 1,2,3,4-tetrachloro-5,5-dimethoxycyclopentadiene and 1,2,3,4-tetrachloro - 5,5 - diethoxycyclopentadiene, respectively. In addition, J. A. Krynitsky and R. W. Bost (Journal of the American Chemical Society, volume 69, 1947, p. 1918) as well as E. P. Ordas (United States Patent No. 2,697,103, granted December 14, 1954) have shown that the same products are obtained by condensing hexahalocyclopentadienes with alcohols in the presence of other alkaline condensing agents, such as sodium hydroxide or alkaline metal alkoxides. In their United States Patent No. 2,562,893, granted August 7, 1951, J. W. Dawson and W. J. Croxall go further to describe the preparation of more complex ketals from alcohols such as n-octanol, whereby the product is the dioctoxy analog of the ketals described above. In pointing out the general applicability of alcohols to this reaction, Dawson and Croxall state in their patent (column 1, lines 18 to 23) that ". . . for reaction with hexachlorocyclopentadiene there may be used such alcohols as methyl, ethyl, propyl, isopropyl, butyl, isobutyl, or sec.-butyl, and amyl, hexyl, heptyl, or octyl in their various isomeric forms."

In view of these teachings of the prior art, we would expect that any other alcohol when treated with a hexahalocyclopentadiene in the presence of an alkaline condensing agent would form the corresponding 5,5-dialkoxy-1,2,3,4-tetrahalocyclopentadiene. Thus, the reaction of hexachlorocyclopentadiene, for example, with allyl alcohol in the presence of KOH would produce the ketal, 5,5-diallyloxy-1,2,3,4-tetrachlorocyclopentadiene.

I have found, however, that the reaction of halogenated cyclopentadienes with allyl alcohol in the presence of alkaline condensing agents proceeds via an entirely different reaction scheme to produce the halogenated cyclic ethers which are the object of this invention. Both removal of the double bond and cyclization take place in the allyl alcohol molecule during the reaction, while one of the halogen atoms in the 5-position in the halogenated cyclopentadiene migrates to the 3-position of the reaction product, which is now a spiro compound with a common carbon atom between the cyclopentadiene and tetrahydrofuran rings. The reaction to form the new compositions of this invention can be shown in the following scheme, where $a$, $b$, $c$, and $d$ represent chlorine, bromine, or hydrogen, and Y represents chlorine or bromine:

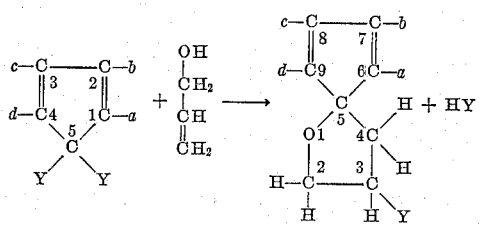

The halogenated cyclopentadienes which are suitable as starting materials in the above process of this invention are, for example, such compounds as hexachlorocyclopentadiene, hexabromocyclopentadiene, 1,2,3,5,5-pentachlorocyclopentadiene, 3,4,5,5-tetrachloro - 1,2 - dibromocyclopentadiene, 1,4,5,5-tetrachloro-2,3-dibromocyclopentadiene, and the like. These compounds are either chemicals of commerce or can be prepared readily by those skilled in the art, as for example by the halogenation of cyclopentadiene under various conditions.

The reaction is carried out very satisfactorily using only an excess of allyl alcohol as the solvent. However, if desired, other inert solvents or diluents can be used. The solvent or diluent utilized can be an aromatic one such as benzene or toluene, an aliphatic one such as heptane or hexane, or a heterocyclic one such as dioxane. Still other solvents will be known to those skilled in the art. The alkaline condensing agent is ordinarily an alkali metal hydroxide such as sodium or potassium hydroxide, but it can also be the alcoholate which is formed by the reaction of the allyl alcohol with an alkali metal such as sodium. The minimum amount of alkaline condensing agent required for the reaction is one mole per mole of the halogenated cyclopentadiene employed. In practice, an excess of up to about twice the theoretically required amount of condensing agent is used. The temperature at which the reaction is carried out is not critical, but it is desirable to maintain the temperature below about 100° C. in order to minimize any tendency for the allyl alcohol to form a Diels-Alder adduct with the halogenated cyclopentadiene. Reaction temperatures between about room temperature and about 60° C. are preferred.

The following examples illustrate the manner in which the new compositions of this invention are prepared:

EXAMPLE 1

*Reaction of allyl alcohol and hexachlorocyclopentadiene*

Hexachlorocyclopentadiene (273 g.; 1 mole) and 1 liter of technical grade allyl alcohol were charged into a 2-liter, 3-necked round-bottomed flask fitted with a mechanical stirrer, a water-cooled reflux condenser, a dropping funnel, and a thermometer immersed at the bulb end in the reaction mixture. The mixture was stirred while a solution of 113 g. (2 moles) of potassium hydroxide in 500 ml. of allyl alcohol was added dropwise over a period of 5 hours at such a rate that the temperature of the reaction mixture did not exceed 30° C. At the end of this time, the solid potassium chloride which had precipitated was filtered off, and the excess allyl alcohol was removed from the filtrate by distillation under reduced pressure. The residue from the distillation was then taken up in 1 liter of ethyl ether, and the ether solution was washed 4 times with 500 cc. portions of cold water and then dried over anhydrous sodium sulfate. The dried ether solution was filtered and stripped of ether on the steam bath. The viscous residue was then distilled in vacuo. A forerun weighing 176.6 g. and consisting of unreacted hexachlorocyclopentadiene was distilled first at a temperature of about 50° C. under 0.3 mm. pressure. Further distillation at 117° under 0.3 mm. pressure gave 136 g. (78% of theory based on the hexachlorocyclopentadiene utilized) of the desired product, 3,6,7,8,9-pentachloro-1-oxaspiro [4.4] nona-6,8-diene, as a pale orange oil which crystallized on standing. Recrystallization of the product from heptane gave colorless crystals, melting point 82.5–83.5° C.

*Analysis.*—$C_8H_5Cl_5O$. Molecular wt.$=294.41$. Calculated: C 32.63%; H 1.71%; Cl 60.22. Found: C 32.96%; H 1.85%; Cl 59.85%.

Molecular weight determined by freezing point depression of benzene$=293$

EXAMPLE 2

*Reaction of allyl alcohol with hexabromocyclopentadiene*

Hexabromocyclopentadiene is prepared as described by R. Riemschneider in La Chimica e l'Industria (Milan), volume 34, 1952, pages 266–268. Thus, freshly-distilled cyclopentadiene (15 g.) is dissolved in 180 cc. of petroleum ether (boiling point 30–50° C.) and is added at 0° C. in small portions and with vigorous stirring over a period of 6 minutes to an ice cooled solution containing 77 g. of bromine in 1800 cc. of 16% sodium hydroxide. The mixture is agitated for 5 to 8 minutes, whereupon the organic layer is separated and the petroleum ether is distilled off. The residual oil is recrystallized from petroleum ether to give 60 to 65% hexabromocyclopentadiene melting at 87–88° C.

Hexabromocyclopentadiene (539 g., 1 mole) prepared on a large scale as described above is treated with allyl alcohol as described in Example 1. The reaction mixture is freed of excess allyl alcohol by distillation, and the residue is taken up in ether, washed with water, dried, and distilled to give the desired product, 3,6,7,8,9-pentabromo-1-oxaspiro [4.4] nona-6,8-diene.

EXAMPLE 3

*Reaction of allyl alcohol with 1,2,3,5,5-pentachlorocyclopentadiene*

1,2,3,5,5-pentachlorocyclopentadiene is prepared from tetrachlorocyclopentadiene as described by R. K. Meyers on pages 40 and 45–48 of his Ph.D thesis, dated February 1950, from the Purdue University at Lafayette, Indiana. The tetrachloro compound itself is prepared by the reduction of hexachlorocyclopentadiene with zinc in hydrochloric acid as described by the same author on pages 20–21 of his dissertation.

The 1,2,3,5,5-pentachlorocyclopentadiene (238 g., 1 mole) is treated with allyl alcohol in the presence of KOH as has been described in Example 1. The excess allyl alcohol is removed from the reaction mixture by distillation. The residue is taken up in ether, washed with water, dried, and distilled to give the desired product, 3,6,7,8-tetrachloro-1-oxaspiro [4.4] nona-6,8-diene.

EXAMPLE 4

*Reaction of allyl alcohol with 1,2-dibromo-3,4,5,5-tetrachlorocyclopentadiene*

1,2-dibromo-3,4,5,5-tetrachlorocyclopentadiene is prepared by careful fractionation of the mixed chloro and bromo cyclopentadienes which are obtained by chlorinating hexabromocyclopentadiene with gaseous chlorine in the presence of aluminum chloride and heating to dehalogenate the resulting halocyclopentenes.

The 1,2-dibromo-3,4,5,5-tetrachlorocyclopentadiene (362 g.; 1 mole) is then treated with allyl alcohol in the presence of potassium hydroxide in the manner which has been detailed in Example 1. Work-up of the reaction mixture gives the desired 6,7-dibromo-3,8,9-trichloro-1-oxaspiro [4.4] nona-6,8-diene.

EXAMPLE 5

*Reaction of allyl alcohol with 2,3-dibromo-1,4,5,5-tetrachlorocyclopentadiene*

2,3-dibromo-1,4,5,5-tetrachlorocyclopentadiene (362 g.; 1 mole), which is obtained by fractionation of chlorinated hexabromocyclopentadiene in the manner described in Example 4, is treated with allyl alcohol in the presence of KOH as described in Example 1 to give 7,8-dibromo-3,6,9-trichloro-1-oxaspiro [4.4] nona-6,8-diene.

The new compositions of this invention are particularly useful as chemical intermediates and as insecticides. It will be evident to those skilled in the art that a multitude of useful compositions can now be prepared by using these heretofore unknown but readily prepared halogenated cyclopentadiene derivatives as starting materials in a variety of syntheses.

However, the new compositions of the present invention are themselves useful as insecticides. For example, the product of Example 1, namely 3,6,7,8,9-pentachloro-1-oxaspiro [4.4] nona-6,8-diene, was tested for control of second instar Mexican bean beetle larvae (*Epilachna varivestis* Muls.) by exposing the larvae to bean leaves dipped in wettable powder suspensions of the compound at a concentration of 4 pounds per 100 gallons of water. The mortality of larvae observed was 100% within 48 hours. Similarly, experiments were carried out in which a 0.5% solution of this compound in acetone was used to impregnate filter paper, which was then dried 4 hours. Third instar milkweed bugs (*Oncopeltus fasciatus* Dall.) were then continuously exposed to the treated and dried paper in test cages supplied with food and water for the test subjects. Complete mortality of the milkweed bugs was observed within 24 hours. In a similar manner, adult granary weevils (*Sitophilus granarius* L.) were exposed continuously to the treated filter paper in cages which were not supplied with food but were provided with water after 24 hours. A 95% mortality of the weevils was observed within 48 hours. These typical test data indicate the usefulness of the new compositions of this invention as insecticides.

These new compositions of this invention can be utilized in all the typical ways that other pesticides are used, such as, for example, in dusts, oil sprays, areosols, water emulsions, etc., and can be applied by any means calculated to utilize their pesticidal properties.

I claim:

1. A composition of the formula

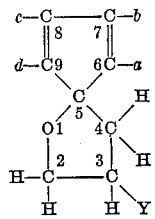

wherein *a, b, c,* and *d* are selected from the group consisting of chlorine, bromine, and hydrogen and Y is selected from the group consisting of chlorine and bromine.

2. The composition of claim 1, wherein *a, b, c, d,* and Y are chlorine.

3. The composition of claim 1, wherein *a, b, c, d,* and Y are bromine.

4. The composition of claim 1, wherein *a, b, c,* and Y are chlorine and *d* is hydrogen.

5. The composition of claim 1, wherein *c, d,* and Y are chlorine and *a* and *b* are bromine.

6. The composition of claim 1, wherein *a*, *d*, and Y are chlorine and *b* and *c* are bromine.

7. The process which comprises reacting allyl alcohol with a halogenated cyclopentadiene of the formula

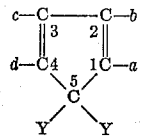

wherein *a*, *b*, *c*, and *d* are selected from the group consisting of chlorine, bromine, and hydrogen and Y is selected from the group consisting of chlorine and bromine, in the presence of at least one molecular proportion of an alkaline condensing agent for each molecular proportion of said halogenated cyclopentadiene.

8. The process of claim 7, wherein the alkaline condensing agent is selected from the group consisting of potassium hydroxide, sodium hydroxide, and sodium allyloxide, said process being carried out at a temperature of less than about 100° C.

9. The process of claim 7, wherein the halogenated cyclopentadiene is hexachlorocyclopentadiene.

10. The process of claim 7, wherein the halogenated cyclopentadiene is hexabromocyclopentadiene.

11. The process of claim 7, wherein the halogenated cyclopentadiene is 1,2,3,5,5-pentachlorocyclopentadiene.

12. The process of claim 7, wherein the halogenated cyclopentadiene is 1,2-dibromo-3,4,5,5-tetrachlorocyclopentadiene.

13. The process of claim 7, wherein the halogenated cyclopentadiene is 2,3-dibromo-1,4,5,5-tetrachlorocyclopentadiene.

References Cited in the file of this patent

Fields: I. Amer. Chem. Soc., vol. 76 (1954), pp. 2709–2710.

McBee et al.: J. Amer. Chem. Soc., vol. 77 (1955), pp. 4427–4428.